(12) United States Patent
Brown et al.

(10) Patent No.: US 7,639,721 B2
(45) Date of Patent: Dec. 29, 2009

(54) LASER PUMPED TUNABLE LASERS

(75) Inventors: David Chester Brown, Brackney, PA (US); Jerry Wayne Kuper, Pittsford, NY (US)

(73) Assignee: Laser Energetics, Inc., Mercerville, NJ (US)

( * ) Notice: Subject to any disclaimer, the term of this patent is extended or adjusted under 35 U.S.C. 154(b) by 0 days.

(21) Appl. No.: 11/565,286

(22) Filed: Nov. 30, 2006

(65) Prior Publication Data
US 2007/0274364 A1      Nov. 29, 2007

Related U.S. Application Data

(63) Continuation-in-part of application No. 11/330,909, filed as application No. PCT/US2004/031150 on Sep. 22, 2004, now abandoned, and a continuation-in-part of application No. 10/983,275, filed on Nov. 8, 2004.

(60) Provisional application No. 60/516,454, filed on Nov. 3, 2003, provisional application No. 60/505,054, filed on Sep. 24, 2003, provisional application No. 60/504,617, filed on Sep. 22, 2003.

(51) Int. Cl.
*H01S 3/091* (2006.01)
(52) U.S. Cl. ....................................... 372/71
(58) Field of Classification Search ........................ None
See application file for complete search history.

(56) References Cited

U.S. PATENT DOCUMENTS

| | | | | | |
|---|---|---|---|---|---|
| 4,794,615 | A | * | 12/1988 | Berger et al. | 372/71 |
| 5,036,520 | A | * | 7/1991 | Bowman et al. | 372/71 |
| 6,094,297 | A | * | 7/2000 | Injeyan et al. | 372/71 |

OTHER PUBLICATIONS

W. Gadomski and B. Ratajska-Gadomska; "Self-Pulsations in Phonon-Assisted Lasers"; vol. 15, No. 11/Nov. 1998/J. Opt. Soc. Am. B.

W. Gadomski; B. Ratajska-Gadomska; R. Meucci; Homoclinic Dynamics of the Vibronic Laser; Chaos, Solitons and Fractals 17 (2003) 387-396.

H. Ogilvy; M.J. Withford; R.P. Mildren; J.A. Piper; "Investigation of the Pump Wavelength Influence on Pulsed Laser Pumped Alexandrite Lasers"; Appl. Phys. B81, 637-644 (2005).

* cited by examiner

*Primary Examiner*—Minsun Harvey
*Assistant Examiner*—Sean Hagan
(74) *Attorney, Agent, or Firm*—Fox Rothschild LLP; Richard C. Woodbridge

(57) ABSTRACT

A laser pumped tunable laser system is disclosed directed to achieving tunable outputs with high wall plug efficiencies. In particular, green laser pumped alexandrite lasers are discussed—both pulsed and CW—where the wall plug efficiencies of greater than 2% can be achieved using practical, commercially available pump lasers. In alternative approaches, frequency converted tunable radiation in the UV is achieved with high efficiency from compact, high beam quality devices.

16 Claims, 3 Drawing Sheets

LASER PUMPED TUNABLE LASERS

REFERENCE TO RELATED APPLICATIONS

This is a continuation in part application of copending application Ser. No. 11/330,909, filed Jan. 12, 2006, entitled "DIODE-PUMPED MICROLASERS INCLUDING RESONATOR MICROCHIPS AND METHODS FOR PRODUCING SAME", which was a national stage application of PCT/US2004/031150, filed Sep. 22, 2004, which claimed the benefit under 35 U.S.C. 119(e) from U.S. Provisional Patent Application Ser. No. 60/504,617 filed on Sep. 22, 2003, U.S. Provisional Patent Application Ser. No. 60/505,054 filed on Sep. 24, 2003, and U.S. Provisional Patent Application Ser. No. 60/516,454, filed Nov. 3, 2003. The aforementioned applications are hereby incorporated herein by reference.

This is also a continuation in part application of copending application Ser. No. 10/983,275, filed Nov. 8, 2004, entitled "LASER PUMPED TUNABLE LASERS". This application is hereby incorporated herein by reference.

BACKGROUND OF THE INVENTION

1. Field of the Invention

The present invention relates generally to laser systems and more specifically to tunable solid-state lasers and techniques for practical realizations of high efficiency, power scalable lasers.

2. Description of Related Art

Tunable lasers in the near infrared region between 700 and 950 nm are highly desirable for medical applications and for short pulse generation. In addition, frequency conversion to higher harmonics of the fundamental harmonic allows accessing a wide spectral region ranging from the deep ultraviolet to the blue. Among the different tunable lasers available at this wavelength range, Cr doped ($Cr^{3+}$) materials such as chrysoberyl ($Cr^{3+}$:$BeAl_2O_4$ or Alexandrite), fluorides such as LiSAF and LiCAF and Ti-doped sapphire are commercially available. Ti:sapphire has the broadest spectral output and high gain but suffers from short lifetime (a few microseconds) which makes it unsuitable for diode pumping. The Cr-doped fluorides have lifetimes near 100 ms and have been successfully pumped by diodes but still require improvements in material quality and growth techniques. Alexandrite, on the other hand, is a well-known developed laser material with peak output near 752 nm and demonstrated broad tunability from about 725 to just over 800 nm as was already shown by Walling et al (see IEEE J. Quant. Electron. QE-16, 1302, 1980). With frequency doubling and tripling of laser radiation it can produce useful tunable output from about 240 to 400 nm, a region of great current interest for potentially high volume applications including micromachining, biophotonics and biological detection. Alexandrite lasers have demonstrated power scalability in both CW and Q-switched operational mode, and are particularly useful in applications requiring higher pulse energies than is available, for example from Ti-doped sapphire lasers. In particular, Alexandrite, in a Q-switched mode, offers the possibility of replacing bulky and inefficient excimer lasers, while offering tunability in the UV-to-blue spectral regimes.

The material is thermally very robust and has been available in a flashlamp-pumped package for many years now. However, flashlamp pumped Alexandrite lasers have very low efficiency—typically less than 1%—and a diode-pumping approach was considered to be a highly desirable approach to achieve higher energy. Since Alexandrite is an orthorhombic crystal that is optically biaxial, it has an absorption spectrum that is different for light polarized parallel to the a, b, and c crystalline axes, with the absorption strongest for pump light electric field parallel to the b axis, peaking at around 600 nm. Because of this strong absorption in the red spectral region (600-650 nm), AlGaInP diode lasers with emission around 640-645 nm have been successfully used to diode pump Alexandrite, as was shown by Scheps et al in Opt. Comm. 97, 363, 1993. These experiments produced however relatively low slope efficiencies (24-26%) despite high absorption of the diode light, a result attributed to Alexandrite's low gain resulting from a relatively small stimulated-emission coefficient. For example at 753 nm and room temperature it is valued at $\sigma_e=0.5\times10^{-20}$ cm$^2$, which is low compared to, e.g., the 1064 nm transition in Nd:YAG where $\sigma_e=3.1\times10^{-19}$ cm$^2$ or Nd:YVO$_4$ which is $16\times10^{-19}$ cm$^2$. This means that to reach threshold, Alexandrite must be pumped at a very high intensity. Indeed, a much higher 64% slope efficiency was achievable in the experiments of Scheps et al by pumping the same alexandrite rod with a high brightness, near diffraction limited dye laser operating at 645 nm along with a threshold lower by about a factor of 2. As derived from these experiments, with a dye laser pump intensity incident on the Alexandrite crystal of about ~5.6 MW/cm$^2$, the average round-trip net gain produced was only about 0.0190 at threshold increasing to 0.083 at the full pump power of 300 mW. This contrasts with a typical incident intensity on a Nd:YVO$_4$ laser end-pumped with a 1W diode at 808 nm of only about 6.4 kW/cm$^2$, i.e., a factor of 100-1000 times less than that required for Alexandrite. The modest gain of Alexandrite means that high pump intensities are essential as well as low-loss resonators with high outcoupler reflectivities.

It is, however, very difficult to obtain the requisite high intensities from diode lasers suitable for pumping Alexandrite. The main difficulty involves the small pump spot diameters required for pumping Alexandrite. Except for low power single mode diodes, higher power bars or diode arrays do not possess the requisite beam quality to enable sufficiently high incident pump intensities. Most diode lasers have very good beam-quality only in the direction perpendicular to the diode stripe, while in the direction parallel to the stripe, the divergence is much higher, resulting in an overall poor beam-quality which prevents focusing to a sufficiently small spot diameter in at least the one dimension. In the experiments of Scheps et al for example, diodes with a stripe width of 60 μm were focused by a 5 cm lens to a spot size of about 10 μm by 18 μm. In contrast the dye laser used in the same report, with its circularly symmetric beam, had a spot diameter of less than 10 μm, resulting in higher pump intensity.

Furthermore, focusing the pump to a small waist at one end of the gain rod means that the spot size increases progressively as it propagates through the rod, making it difficult to maintain the desired pump intensity throughout the length of the gain medium.

Scaling up to the watt or tens of watts level using an approach based on available red single-mode diode powers does not appear to be promising, at least based on current technology. The existing art in this field is therefore deficient in providing practical solutions to the problem of constructing practical efficient and scalable tunable laser devices based on relatively low gain materials such as Alexandrite. There is in particular a need to provide constructions suitable for end pumping of a tunable laser medium that are compatible with power scaling and can be applied to many different media and geometries without introducing undue complexities.

SUMMARY OF THE INVENTION

The present invention utilizes a high brightness source to pump the tunable laser of the invention.

The present invention also provides techniques and constructions for tunable laser resonators that can be applied to low gain materials to thereby produce high efficiency tunable output.

The present invention applies the laser pumping approach to alexandrite lasers in a manner that is designed to be economical and straight forward to implement.

The pumping technique is preferably applied to different types of tunable lasers including Cr-doped fluoride materials such as Cr:LiSAF and Cr:LiCAF.

Unlike prior art which utilized direct diode pumping of the laser medium, the present invention preferably relies on diode pumped lasers that are readily available commercially as the high brightness pump source.

DETAILED DESCRIPTION OF THE INVENTION

The present application discloses techniques of pumping tunable lasers utilizing a high brightness source, preferably a laser. The preferred embodiments discussed represent an alternative to the prior art approach of pumping the tunable laser directly with low-brightness diode lasers, which has so far failed to produce power scalable tunable radiation efficiently enough for materials such as alexandrite and Cr-doped fluorides. This application is directed primarily to a laser pumped laser approach using radiation from a laser source that may in itself be diode pumped. In this case, the diode-pumped laser pump source in effect acts as a diode laser "beam clean up system", effectively converting the output of low beam-quality diode arrays into a higher brightness output radiation which can be used to pump the tunable laser materials of the invention at high intensity.

Preferably, the pump source can provide a near diffraction-limited output beam that can be matched to the absorption spectrum of the tunable material. Alexandrite and other similar materials. This approach is particularly well suited to tunable materials producing radiation in the near-IR part of the spectrum (ranging from about 690 to just over 1000 nm) because they typically possess absorption bands in the visible range where highly efficient diode-pumped lasers are already well-developed and commercially available. In particular, numerous commercial vendors currently manufacture diode-pumped lasers based on frequency doubled Nd-doped gain media, capable of producing near-diffraction-limited beams in the visible at power levels ranging from 1W to over 100 W in a variety of operational modes, including CW, Quasi-CW, Q-Switched and mode-locked. High beam quality beams can, in turn, be focused to very small spot diameters, as required for efficient pumping of tunable materials with relatively low gain such as Alexandrite and Cr:LiSAF, Cr:LiCAF and similar media. Furthermore, with visible high brightness pump sources becoming increasingly available commercially at power levels exceeding 100 W power, the technique disclosed herein provides a straight forward and practical path to power scaling of the tunable lasers.

Figure 1:
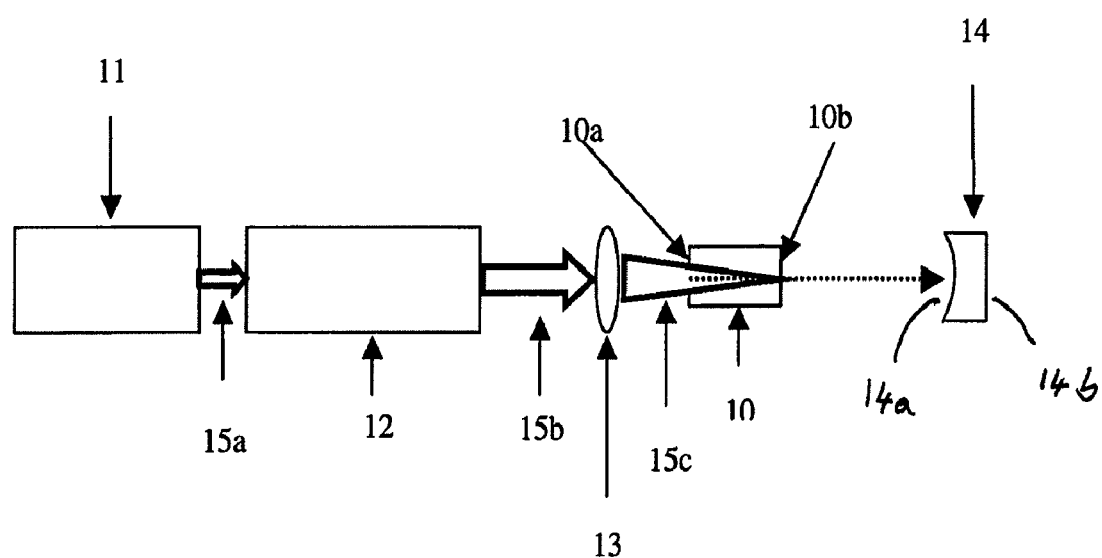
FIG. 1 is a schematic of a laser pumped alexandrite laser system.

FIG. 1 shows one preferred embodiment of the laser pumped laser design. In this figure, the pump beam 15$a$ comprising the output of a high brightness laser 11 has a wavelength that matches the absorption spectrum of tunable laser gain medium 10. The beam 15$a$ is preferably near diffraction limited with an $M^2$ approaching unity. In alternative embodiments, depending on the properties of the tunable gain medium, the pump beam may be multi-mode with $M^2$ as high as 5-6 while still falling within the scope of the principles of the invention. The beam 15$a$ may be further optically conditioned, for example by expanding and collimating through an optical system 12, to thereby form an expanded beam 15$b$ which has selectable divergence properties. The expanded pump beam 15$b$ is focused along path 15$c$ by a lens or lens system 13 into the tunable lasing medium 10 so that the minimum pump beam focal spot size is contained within the medium 10. The tunable laser resonator may be formed by the rear surface of the laser medium 10$a$ and the curved first surface 14$a$ of the output coupler 14. The reflectivity of laser medium surface 10$a$ is designed to be highly transmitting to the pump beam radiation and highly reflective across the tunable laser wavelength range. The reflectivity of the distal laser medium surface 10$b$ is generally selected to minimize optical losses that would otherwise be experienced by the tunable laser emission. Alternatively to the HR coated surface 14$a$, a separate pump input mirror may be utilized which is similarly coated to maximize pump transmission and tunable laser reflection. Either the back surface 10$a$ or the separate pump input mirror may have a curved surface, with the curvature selected, along with that of the first surface 14$a$ of the output coupled 14, to optimize the overlap between the pump beam excitation volume and the resonator mode volume. Such mode matching is known to those skilled in the art to be an essential design feature for efficiently producing low order transverse mode beams, and especially $TEM_{00}$ radiation. The reflectivity of the first surface 14 $a$ of the output is generally chosen to maximize the laser output for a given excitation level of the pump laser and the corresponding thermal lens properties of the resonator. Such resonator design aspects, including techniques to compensate for thermal lens are well known in the art of solid state laser resonator design.

Note that in a preferred approach to constructing a tunable laser, the HR and AR coatings may also be designed to be HR and AR over the full tuning range of the tunable material. The tunable laser of FIG. 1 may comprise additional elements inside the resonator functionally adapted for example, to tune or narrow the bandwidth of the laser output produced or to convert the wavelength of the laser using various nonlinear processes such as second-harmonic-generation (SHG), third-harmonic-generation (THG), fourth-harmonic-generation (FHG) or Raman shifting or optical parametric amplification (OPA).

Figure 2:
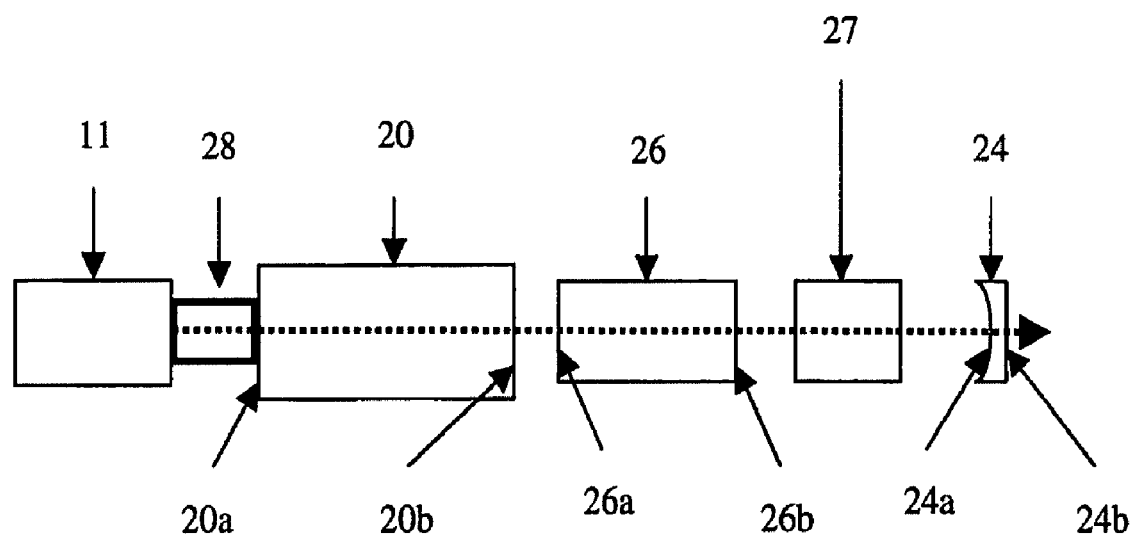
FIG. 2 shows an embodiment of a frequency doubled laser pumped alexandrite laser system.

In a variation on the basic laser pumped laser of FIG. 1 an embodiment of a frequency-doubled tunable laser system is shown in FIG. 2. In this figure, the output beam from a diffraction limited pump laser 11 passes through beam collimation and focusing optics 28 and is absorbed in the laser medium 20. The laser resonator cavity is formed by the rear surface of the laser medium 20$a$ and the first surface of the output coupler 24$a$. As previously described, the first surface of the laser medium 20$a$ is designed to provide high transmission of the pump laser wavelength and high reflectivity of the tunable laser wavelength. In this laser design, the reflectivity of the output coupler first surface 24a is chosen to reflect all of the fundamental radiation, but transmit the frequency-doubled radiation from the laser resonator cavity. Additional elements may be contained in this cavity such as the frequency doubling crystal 26 and a wavelength selection device 27. The surfaces of the frequency doubling crystal 26a and 26b are designed to provide low loss at the fundamental and harmonic wavelengths of the alexandrite laser. The output surface 14b of the output coupler mirror is designed to provide low loss for the frequency-doubled radiation. The wavelength selection device 27 is typically chosen to reduce the normally broad alexandrite laser emission bandwidth to match the acceptance bandwidth of the frequency doubling crystal 26, as is customary in the art of designing intra-cavity doubled, tunable solid state lasers. Note that it is important to keep optical losses associated with device 17 to a minimum within the desired laser emission band, especially when the laser medium is relatively low gain.

One advantage offered by Alexandrite as the tunable medium is that it offers tunability around the peak wavelength near 750 nm and can be operated as free-running with a broad bandwidth, or dispersive elements can be placed inside the resonator to allow tuning. Because of the low gain of Alexandrite, such dispersive elements must have a very low loss, a fact that is well known from the art of designing alexandrite lasers. Of particular interest in this invention is the ability to generate ultraviolet light through frequency-doubling or tripling as was shown in FIG. 2. The corresponding wavelengths would then be near 375 nm and 250 nm respectively, with some additional tuning limited only by the phase matching properties and spectral bandwidth of the nonlinear crystal.

Note that in the embodiment of FIG. 2 the nonlinear crystal was placed inside the resonator. In alternative embodiments aiming to convert pulsed lasers, a Q-switch may be placed inside the laser pumped laser resonator resulting in short pulse output, typically in the 10's of nanosecond range. In this case, the high peak powers make it practical to use extracavity conversion as another option for providing harmonic wavelengths. In this case again, dispersive elements may need to be inserted in the alexandrite cavity to narrow the fundamental light sufficiently to allow efficient frequency-conversion. It is notable that the doubling efficiency can be significantly increased for a pulsed laser and conversion efficiencies of 40% or greater are projected in extracavity conversion and possibly even more with an intracavity arrangement. It should be realized that a similar laser-pumped-laser architecture can provide mode-locked operation with sub-picosecond pulses.

It should be obvious to those trained in the art that the laser depicted in FIG. 2 can be used to provide fixed-frequency or tunable operation in the ultraviolet spectral region, and that the use of a visible diode-pumped laser to pump the Alexandrite can lead to efficient ultraviolet laser systems in either mode. In addition, alexandrite has a number of other advantages for practical power scaled operation. The gain material is known to be thermally robust with a thermal conductivity that is about twice that of Nd:YAG. It has a large thermal rupture modulus and can therefore be used with success in high-average-power lasers. With diode-pumped visible lasers with hundreds of watts of green output power now available, Alexandrite lasers can thus be developed using the techniques outlined in this invention with average powers of tens of watts or more.

In one particular example, Alexandrite is used as the tunable laser medium. In this case, the high brightness laser source may comprise the frequency doubled green radiation of commonly used diode-pumped laser materials such as Nd:YVO$_4$, Nd:YAG, Nd:YLF, Nd:YALO (YAP) and Yb:YAG lasers, all of which can produce output in the green visible region. Note that of these, the Nd doped media lasers can also produce useful output in the red and spectral regions by frequency doubling alternative Nd laser transitions. In one preferred embodiment of a laser pumped alexandrite, the high brightness green laser pump source may comprise, a frequency doubled diode pumped CW Nd:YVO$_4$ laser such as the Millenia commercially available from Spectra-Physics or the Verdi from Coherent. Both lasers are available at power levels of 5 W and 10 W, and, in the case of the VERDI, also 15 W with near-perfect TEM00 mode and very low noise characteristics. Other manufacturers of low cost CW green lasers include the disc lasers from ESL and Jenoptik, which provide near-diffraction-limited as well as multi-mode beams. Alternatively, pulsed green lasers may be utilized operating at high repetition rates such as the AVIA available from Coherent Inc. or the Navigator Laser Series from Spectra-Physics. Recently, frequency doubled fiber lasers with energy outputs in excess of 1-2 mJ and $M^2$ between 1 and 3 have become commercially available, for example from IPG. These are generally available at very low cost and can provide highly efficient, cost effective and practical high brightness pump sources for alexandrite as well as other tunable Cr-doped materials. One advantage of the fiber lasers is that their fundamental radiation may be tuned to near 1100 nm, yielding a frequency doubled source at or near 550 nm which is an excellent match to the alexandrite absorption bands, as will be discussed further below. In still other examples of suitable pump lasers, a side pumped green laser offering in excess of 30 W at 1-5 kHz repetition rate may be used to pump alexandrite lasers. Pulsed Nd:YLF green lasers are available from numerous vendors, including Spectra-Physics, Coherent and Quantronics.

Any of these commercial diode-pumped lasers are known to be highly efficient. In particular, commonly available frequency-doubled Nd:YVO$_4$ lasers are know to have optical-to-optical efficiencies greater than 15% and wall plug efficiencies (electrical-to-output) of over 10%. By contrast, it is worth noting that although laser pumped alexandrite was demonstrated previously (see for example, Lai et al in J. Appl. Phys. 54, 5642, 1983) this was done using an Argon CW laser operating at 647.1 nm, which is known to have notoriously low efficiency, generally less than 0.3%. Such a pump source, although possessing high beam quality, is not suitable for use in the efficient laser pumped systems of the present invention, for which high overall efficiency is a key criterion. Similar deficiencies limit any potential use of a dye laser as a pump source for alexandrite, as such lasers are also known to be inefficient and possess poor reliability features.

Thus, it is preferred that the overall electrical-to-output efficiency (at the peak of the tuning curve) of the laser-pumped tunable laser constructed according to principles of the invention exceed 2% and preferably approach or even exceed 10%. In the case of alexandrite, this is readily achievable using the laser pumped approach of the invention, based on projections from the early experiments utilizing the ion laser or dye laser pumping experiments and recent preliminary experiments conducted by the authors of the present invention.

In one illustrative example, using the dye-laser-pumped Alexandrite laser taught by Scheps et al in U.S. Pat. No. 5,090,019 as a model, the efficiency of a diode pumped green laser pumped Alexandrite laser can be estimated as follows. With a pump beam wavelength of 532 nm (characteristic of Nd:YAG or Nd:YVO$_4$), a pump spot size diameter of about 2 μm and assuming that the Alexandrite laser material has the well known absorption characteristics shown by Walling et al and by Scheps et al, incident pump spot, the slope efficiencies can be scaled from the dye pumping experiments of Scheps et al by roughly the ratio of the quantum defects, i.e., the ratio of the pump wavelengths, or 532/645, yielding maximum slope efficiencies on the order of 40-45%. A similar result is obtained based on the early ion laser pumped experiment where slope efficiency as high as 51% were obtained with the peak of the emission curve at 752 nm using 1.6 W of input power at 647 nm and a resonator designed for optimal mode matching characteristics, Then for a CW 532 nm Nd:YVO$_4$ laser with a maximum wallplug efficiency of 20-25%, overall system efficiency can be as high as 8-11%. This is comparable to the point efficiency of ~11% obtained by Scheps et al using direct diode-pumping of Alexandrite. However, since the typical efficiency of red visible laser diodes is only about 30% (as compared with well over 40% for standard laser diodes near 800 nm used to pump Nd-doped lasers) the wall plug efficiency for direct diode-pumping is estimated to be less than about 3.5%, i.e., a factor of almost three times less than green laser pumped Alexandrite. Furthermore, whereas visible laser diodes are expected to improve in performance in the future, such improvements are not likely to allow economic power scaling of alexandrite lasers. Moreover, the performance of green visible lasers is also improving with time, especially in terms of further power scaling, and the advent of frequency doubled fiber lasers, with more than 25% overall efficiency offers still better prospects for the laser pumped laser of the invention. In the case of alexandrite, the possibility of average power scaling to well over 10 W, in either CW or pulsed mode with near-diffraction-limited output opens up performance levels not attainable to this date with any other tunable laser, including commercially available lamp-pumped alexandrite and green laser pumped Ti:sapphire lasers.

In addition to high overall efficiencies, the laser pumped architecture of the invention has a number of other attractive features. In the case of low gain media such as Alexandrite, the use of a laser pumped laser configuration accomplishes the twin goals of producing small excitation spot diameters allowing operation with the large pump intensities required for achieving lower thresholds and higher slope efficiencies. In the preferred generic configuration shown in FIG. 1 use of a near diffraction-limited M$^2$~1 laser emitting in the region of the tunable laser material absorption bands, the pump spot diameter produced can be very small, typically of the order of a micron, assuming circularly symmetric pump beams as is typical in most diode pumped lasers.

As is well known in the art, the far-field beam diameters do can be calculated from the following relationship:

$$d_0 = \frac{4M^2 \lambda f}{\pi D_0} \quad (1)$$

where $\lambda$ is the diode wavelength, f the lens focal length, and D$_0$ the beam diameter at the focusing lens and M$^2$ characterizing the beam quality, with M$^2$=1 representing a perfect TEM$_{00}$ diffraction-limited beam. In the example of the diode pumping experiments of Scheps et al, the far-field beam diameter was 18 μm, the focal length of the lens 5 cm, and the wavelength about 645 nm. With D$_0$ estimated at ~2 cm and M$^2$=1.0 for the perpendicular direction, the actual far-field spot at the location of the Alexandrite was highly elliptical due to the disparity in beam-quality between the perpendicular and parallel directions, and is estimated as 2 μm×18 μm. By contrast, for the dye laser also used in the same said reference the real spot diameter at the location of the Alexandrite crystal was circular with a diameter estimated to be about 2 μm, after making adjustments for the wavelength disparity. The beam-quality of the diode laser thus has a dramatic effect on the intensity achieved in the far-field where the Alexandrite was located, with the diode laser producing about ~9 times less intensity in the far-field than the dye laser pump under similar conditions.

It is further noted that the actual spot diameter achieved in the tunable laser crystal of FIG. 1 crystal is dependent upon the crystal length. If a beam has a diameter d$_0$ at a waist at the entrance face of the crystal, then following propagation through the length L of the crystal, the spot diameter d$_{exit}$ is given by $$d_{exit} = d_0 \left[ 1 + \left( \frac{4M^2 \lambda f}{n \pi d_0^2} \right)^2 \right]^{1/2} \quad (2)$$

where n is the index of refraction of the laser crystal. The exit beam diameter is thus seen to be larger than the entrance diameter. In the prior art example of Scheps et al, the exit diameter can be calculated to be as large as about 2 mm. Equation (2) thus has to be integrated over the crystal length to obtain the average spot diameter in the crystal, with the result that the average diameter d can be calculated from $$\bar{d} = \frac{2LM^2 \lambda}{\pi d_0 n} \quad (3)$$

For M$^2$=8.6 (corresponding to the estimated divergence in the transverse direction of the diode laser pump of Scheps et al), d$_0$=10 μm, λ=645 nm, and n=1.74, $\bar{d}$=1014 μm, or an average spot size of about 1 mm. If the pump beam is focused into the center of the crystal, the average beam diameter is about 0.5 mm. With the fundamental mode diameter estimated to be about 1.5 mm, the overlap between the pump beam in the Alexandrite and the fundamental mode was reasonably good, and this is one reason why the slope efficiency obtained in these experiments was relatively so high. When the diode was used for pumping however, the perpendicular direction spot diameter was close to that achieved using the dye laser, but in the parallel direction where beam-quality was much worse, hence the overlap between the diode pump beam and the resonator fundamental beam was poor, resulting in an overall low slope efficiency. This example illustrates the importance of mode matching as well as the penalty associated with divergent pump beams.

In a set of recent preliminary experiments illustrating some of the principles of the inventive steps disclosed herein, an alexandrite crystal was used as the tunable laser medium and a Snake Creek Laser SCL-CW-532-200 provided as the pump source. This laser provides a CW near diffraction-limited output (M$^2$<1.1) of up to 215 mW of power at 532 nm. The laser output was collimated to a 5 mm beam diameter and focused into the center of the alexandrite laser crystal using a 15 cm AR coated fused silica lens. The laser medium was a 3 mm diameter by 7 mm long alexandrite laser crystal with a Cr+3 doping of approximately 0.3%. The single pass absorption of the alexandrite crystal at this wavelength was estimated to be approximately 75%. A simple resonator was constructed comprising an output coupler with a 150 mm radius of curvature placed approximately 10 cm from the output face of the laser crystal. The output mirror transmission of 0.5% produced a 50 mW absorbed power threshold and maximum output of 4 mW at 753 nm was achieved with an absorbed power of 160 mW.

In a second experiment conducted with the same configuration but with an output mirror with a 1 m radius of curvature and a 0.75% transmission for the alexandrite output produced a slope efficiency of 10.5% a maximum output of 11 mW at 753 nm was achieved with an absorbed power of 160 mW, corresponding to a slope efficiency of 10.5%.

In a third experiment a pulsed pump laser source from Spectra-Physics (INDI) was used. It was operating at about 20 Hz and producing just over 25 mJ/pulse with a pulsewidth of approximately 30 ns FWHM. With the 3×6 mm 532 nm beam focused into the alexandrite laser crystal using a 15 cm fused silica lens (13), a beam waist placed at the output surface of the laser medium, a 15 cm radius of curvature output coupler mirror placed 14 cm from the output face of the laser medium, a maximum output power of 60 µjoules/pulse was achieved with 10 mJ/pulse input, corresponding to a threshold power of approximately 5 mJ/pulse.

Additional CW Experiments:

In a fourth set of experiments, a Spectra-Physics Millennia CW 5W 532 nm laser system was the pump source for an alexandrite laser rod. This laser provided a $TEM_{00}$ spatial mode with a 2.3 mm beam diameter ($1/e^2$) and a full angle beam divergence of <0.5 mrad. The laser was allowed to freely expand over 85 cm from the laser output aperture before it was focused into an alexandrite laser rod with a 150 mm focal length lens. The lens mount was attached to a single axis translation stage. The approximately 3 mm beam diameter ($1/e^2$) was focused to a minimum diameter of 65 microns. The 3 mm diameter by 7 mm long alexandrite rod had the B-axis aligned parallel to the optical table and was held in a split copper clamp. A thermocouple probe was attached to the copper clamp next to the alexandrite rod to provide temperature measurements. The rod had a $Cr^{+3}$ concentration of 0.3 atomic % and provided a 96% absorption of the pump radiation. The rod had a high reflective coating (at 750 nm) on one end of the rod, which passed >98% of the pump radiation. The other end of the alexandrite rod had an AR coating at the 750 nm fundamental wavelength. The rod holder was placed in an XY tilt mount, which was attached to an XYZ translation mount. The output coupler mirrors used in these experiments had a 150 mm focal length and reflectivities of 98, 93 and 88% at 755 nm. The output coupler mirror was held in a XY tilt mount, which was attached to a single axis translation stage. The translation stages were employed to optimize the mode matching of the focused 532 nm pump beam and the 750 nm resonator mode. The 750 nm output radiation was collimated with a 200 mm focal length lens and separated from the residual 532 nm pump light with two flat, 750 nm HR mirrors.

The performance of the alexandrite laser resonator was obtained using a series of reflective output coupler mirrors. The laser performance was optimized for each point, which involved small adjustments to the cavity component positions. The laser output beam was primarily a $TEM_{00}$, with some low order modes also present at the higher pump powers. The 93% R laser resonator exhibited a 714 mW threshold power and provided a 36% slope efficiency. A maximum output power of 1.42 W was achieved in the free running mode, which represents an optical to optical efficiency of 31%. This is to our knowledge the highest CW power obtained from a CW alexandrite laser.

Additional experiments were conducted with 98 and 88% reflective output couplers. The 98% R output coupler provided a threshold of 120 mW and a slope efficiency of 20%. A maximum output of 520 mW was achieved with 3 W of absorbed 532 nm pump, which represents a 17% optical efficiency. The 88% R output coupler mirror produced a 1.143 W threshold and a slope efficiency of 32%. A maximum output of 1.06 W was achieved with 4.5 W of absorbed pump power, which represents a 23% optical efficiency. A Findlay-Clay analysis of the threshold power versus output mirror reflectivity indicates that the single pass loss of the resonator was less than 2%.

CW Line Narrowed Experiments:

Yet another experiment was conducted with line narrowing the output of the 93% R output coupler mirror resonator. A single plate birefringent tuner element of approximately 1 mm thickness was placed in the resonator in close proximity to the alexandrite laser rod at Brewster's angle. A maximum output of 790 mW was achieved in a single spectral peak, with an optical conversion efficiency of 25.5%. The obtained power is to our knowledge the highest frequency narrowed power obtained from a CW alexandrite laser. A measurement of the laser output linewidth yielded 0.16 nm full width at half maximum (FWHM). The laser was tuned with this single plate from approximately 730 nm to 780 nm.

Pulsed Green Pumped Alexandrite Experiments:

In a final series of experiments we examined the potential for using a pulsed diode pumped 527 nm source to pump an alexandrite laser. A Quantronix Darwin 527 nm Nd:YLF DPSS laser was used for these experiments. The laser was operated in an external trigger mode so that parametric experiments could be performed on the laser output versus pulse repetition rate (PRR) of the pump laser source.

The Quantronix Darwin 527 laser system output beam was expanded using a 5× Galilean expansion telescope (−10 mm and +50 mm). The expanded beam had an approximately 10 mm×15 mm elliptical shape, tilted at approximately 45 degrees from the horizontal direction. This beam was then focused with a 300 mm plano convex lens into the alexandrite rod. The focusing lens could be translated along the optical path to allow the mode matching of the pump beam focus to the alexandrite resonator mode. The alexandrite rod was 3 mm in diameter by 12 mm long with flat/flat faces and had a $Cr^{+3}$ concentration of 0.3 atomic percent. The absorption of this rod at 532 nm was measured to be 99.2%. The alexandrite rod had a coating placed on the side toward the pump laser that was highly transmitting to 532 nm and highly reflecting at 760 nm. The coating at the opposite end was anti-reflection coated at 760 nm. The alexandrite rod was held in a split copper clamp and had XY tilt and XYZ translation adjustments. A single plate birefringent tuner plate was placed in the resonator in close proximity to the alexandrite rod for the line narrowed and frequency doubled experiments. The fixed BRT plate could be tuned by the tip, tilt and rotation adjustments of its mount. The BBO second harmonic crystal (31.3 degree Type I) was placed adjacent to the BRT mount on a goniometric adjustable mount. The BBO crystal had single pass loss of <1% at the fundamental alexandrite wavelength. The output coupler mirror had a 300 mm curvature and a 97% reflectivity to the 760 nm radiation and was highly transmitting at the first harmonic wavelength (380 nm).

Broadband Pulsed Experiments:

An initial series of pulsed pumped experiments were performed with a "free" running version of the resonator. The results of these experiments are summarized in Table 1. This resonator did not have a BRT plate and therefore produced a broad bandwidth of approximately 8 nm FWHM. The BBO crystal was also removed for these laser experiments. The laser threshold was observed to decrease with increasing PRR. This drop in threshold is the result of the higher gain achieved with high pump load on the laser rod. The observed slope efficiency mirrors the pump laser efficiency at the various operating repetition rates. The pump laser beam quality and 527 nm output power decrease by 15% at the higher pulse rates. The slope efficiency and optical to optical conversion efficiency of the alexandrite resonator mirrored this behavior.

drite will provide stable laser performance at higher focused power densities and bode well for higher efficiency alexandrite lasers.

The pulsed diode pumped Alexandrite laser output has been achieved using a pulsed diode pumped 527 nm source with poor beam quality at pulse repetition rates up to 1000 Hz. The alexandrite laser output pulses are approximately 30% longer than the pump source pulsewidth. These experiments represent the highest PRR ever achieved for a "Q-switched"

TABLE 1

A Comparison of the Alexandrite Free Running Laser Performance versus PRR of the Pump Laser at a Maximum Pump Laser Diode Current of 20 A. Quantronix 527 nm Pumped Alexandrite: 3 × 12 mm 0.3% at % Cr + 3 300 mm PCX- 3% Transmission Outcoupler Resonator Performance

| PRR (Hz) | Threshold 532 nm Pump Energy (mJ) | Slope Efficiency (%) | Maximum 752 nm Output Energy (mJ) | Maximum 532 nm Pump Energy (mJ) | Alexandrite Heat Sink Temperature |
|---|---|---|---|---|---|
| 200 | 0.74 | 26.8 | 0.98 | 4.6 | 33 |
| 300 | 0.87 | 28.7 | 1.03 | 4.72 | 30 |
| 400 | 0.67 | 24.8 | 0.97 | 4.75 | 31 |
| 500 | 0.6 | 25.6 | 1.0 | 4.72 | 33 |
| 600 | 0.54 | 24.5 | 0.96 | 4.6 | 34 |
| 700 | 0.43 | 23.4 | 0.89 | 4.36 | 35 |
| 800 | 0.55 | 24.7 | 0.89 | 4.31 | 35 |
| 900 | 0.68 | 24.3 | 0.84 | 4.33 | 40 |
| 1000 | 0.42 | 20.9 | 0.77 | 4.1 | 47 |

Second Harmonic Generation:

An experiment was conducted on the harmonic conversion of a line-narrowed alexandrite. The laser was operated at a PRR of 500 Hz. This PRR was chosen to provide the best beam quality available for the 527 nm pump source. The stated beam quality of this laser is <20× diffraction limit. There was no attempt made to quantify this value. An estimate for the minimum beam spot diameter of the pump beam in the alexandrite rod is 450 μm. The single plate BRT provided a bandwidth of <0.23 nm throughout the pump levels of these experiments. The side lobes spaced by 1.1 nm from the primary band contained <5% of the total intensity. The Type I BBO crystal (3×3×7 mm) was placed in the resonator cavity adjacent to the BRT tuner. This resonator provided two 380 nm output beams. The primary 380 nm beam exited through the output coupler mirror and was captured with two harmonic separating mirrors after the output beams passed through a 300 mm collimating lens. A second 380 nm beam was captured off the reflection from the BRT plate. The 380 nm beam produced by a Type I harmonic process is polarized orthogonal to the fundamental beam and therefore was highly reflected from the Brewster angled BRT plate (55°). This beam was captured by a single harmonic separator mirrors. The fundamental beam was captured from the output coupler beam after the first harmonic separator mirror. A maximum total output of 176 μJ/pulse was achieved at 380 nm. This represents 38% of the total power emitted from the resonator.

The use of a high brightness 532 nm pump laser source has provided excellent alexandrite laser performance. Initial CW harmonic generation experiments have produced >25 mW output at the second harmonic (375 nm). Future work will increase this to >100 mW and extend the output to the third harmonic (250 nm). A slope efficiency of >50% can be achieved by a reduction of the pump laser focused beam spot size. The excellent thermal mechanical properties of alexanalexandrite laser. The output of the pulsed alexandrite laser can be line narrowed using a single birefringent tuner plate to provide a bandwidth of approximately 0.2 nm. This bandwidth is well matched to the spectral acceptance bandwidth of a BBO SHG doubling crystal. Over 38% of the output of a Q-switched resonator can be converted to the second harmonic using an intracavity SHG crystal. The dual wavelength output of this resonator could only be achromatically focused to a peak power of 140 kW/cm$^2$. This power level is too low for the production of significant third harmonic from the fundamental alexandrite laser (250 nm). The present output can be increased, but a factor of 10 enhancement in the peak power is needed to obtain an efficient response from the BBO THG crystal. Using a near-diffraction-limited pulsed green laser can dramatically improve the THG conversion efficiency. Intracavity THG is also quite feasible.

The performance achieved in these experiments was considered proof-of-principle, as mode matching was far from optimal. Based on these early results, it is however expected that more optimal resonator designs will yield much higher slope efficiencies as predicted based on the results of calculations.

Figure 3:
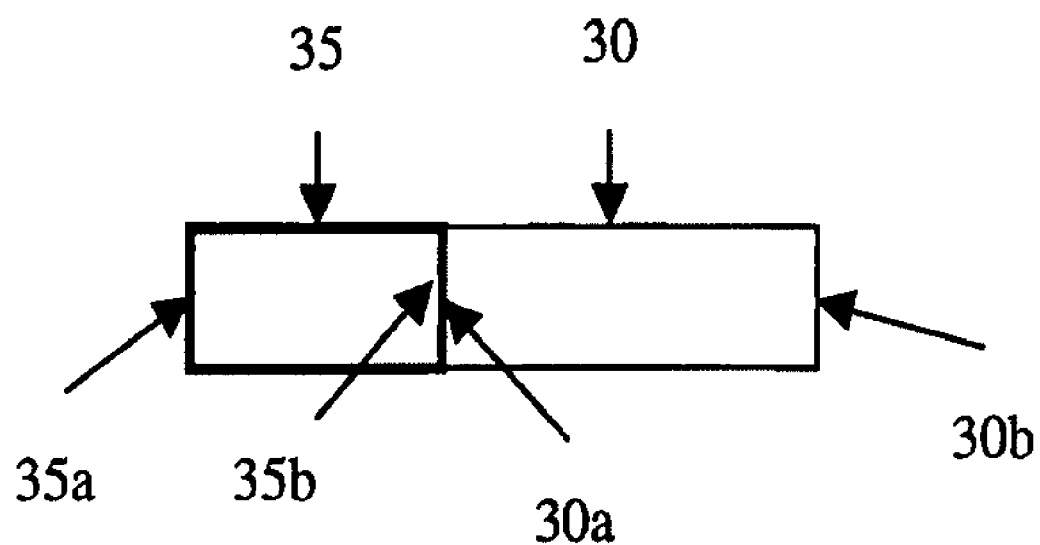
FIG. 3 describes one embodiment of an Alexandrite Laser Medium Design suitable for high power.

One issue with using pulsed lasers for pumping tunable materials is damage. In the above third experiment, it was found that placement of the pump beam waist in the center of the laser medium results in damage to the crystal face, with damage observed, typically at a fluence of 250 Mw/cm of 532 nm pump radiation. One possible approach to the damage issue encountered when pumping by short pulse laser would be to add an un-doped segment of material to the input face of the laser medium, as shown in the embodiment of FIG. 3. The laser medium 30 has a piece of undoped sapphire 35 bonded to the input face 30*a* of the laser medium. This bond is created by optically contacting the output face 35*b* of the sapphire piece to the laser medium input face 30*a*. Onyx Optics in Dublin, Calif. has shown that this type of technique is a commercially viable approach. This design can provide a low loss interface, which has a significantly higher damage threshold than an adhesive joint and that of a coating applied at an air interface. The reflective coating is then placed on the sapphire input surface 35a. Using this component in the laser pumped laser design, the focused pump beam size on this coated surface is substantially larger than the standard designs using a tunable laser medium alone, thereby allowing for higher power pumping of the alexandrite laser medium without damage. In alternative embodiments, the sapphire medium can be substituted by other suitable materials, such as rutile or fused silica to achieve the same purpose.

There are a number of well-developed lasers that can be used to pump the tunable media of the invention, including, in particular, Alexandrite. Table 1 shows a number of transitions available in various laser materials that could be used for this purpose. More specifically, Table 1 shows fundamental and second harmonic wavelengths for various laser crystals, where the laser transitions are assumed operating near 300° K.

| Material/Transition | Fundamental Wavelength (nm) | SHG Wavelength (nm) |
|---|---|---|
| Nd: YAG | | |
| $^4F_{3/2}$-$^4I_{13/2}$ | 1318.70 | 659.35 |
| $^4F_{3/2}$-$^4I_{11/2}$ | 1064.20 | 532.10 |
| Nd: YVO$_4$ | | |
| $^4F_{3/2}$-$^4I_{13/2}$ | 1341.92 | 670.96 |
| $^4F_{3/2}$-$^4I_{11/2}$ | 1064.28 | 532.14 |
| Nd: YALO | | |
| $^4F_{3/2}$-$^4I_{13/2}$ | 1341.40 | 670.70 |

For Nd:YAG for example, or Nd:YVO$_4$, both of which have a major laser transition at 1064 nm, the doubled wavelength of 532 nm is at a wavelength that is strongly absorbed by Alexandrite for the electric field E parallel to b. Moreover the absorption cross-section is almost identical to that of a pump wavelength of 645 nm used in the prior art experiments. The longer wavelength transition at 1318.7 nm in Nd:YAG could also be used since doubled it produces 659.35 nm. At that wavelength the absorption cross-section is about 50% of that at 645 nm, the wavelength used in the original prior art dye laser pumping experiments of Scheps et al. The absorption efficiency then drops off rapidly and at 670 nm, corresponding to the frequency doubled 1340 nm transitions of Nd:YVO$_4$ and Nd:YALO the absorption it falls in the wings of the Alexandrite absorption spectrum and is therefore of marginal interest for this material, but is of special interest for other Cr-doped media such as Cr:LiSAF. On the other hand the 540 nm frequency doubled fundamental transition in Nd:YALO is of interest because the Alexandrite absorption at that wavelength is almost double that at 532 nm or 645 nm. A plethora of possible laser transitions thus exist that can be used to optically pump Alexandrite. Lasers operating on the longer wavelength transition in the red generally have smaller output power and efficiency than Green lasers however, primarily because the stimulated-emission cross-sections for those transitions are lower by a factor of 2-3 than the primary transitions at or near 1064 nm. The fact that diode-pumped lasers operating in the green can be very efficient, with conversion efficiency from the 808 nm pump diodes output to green output in the range of 10-30% for Nd:YVO$_4$, coupled with a shorter wavelength which makes it easy to achieve small spot diameters, makes them a near ideal choice to pump Alexandrite lasers. Other laser pumps which may be useful for pumping Alexandrite and other tunable materials include a frequency-doubled Yb fiber laser operating around 1020-1100 nm. Frequency-tripled erbium doped lasers operating near the common wavelength of 1500 nm may also be used.

Although the preceding discussion addresses Alexandrite, the techniques described in this disclosure can be adapted for other tunable gain media as well. For example, Cr:LiSAF and Cr:LiCAF are tunable materials in the near infra red and offer gains that are somewhat larger than alexandrite. Cr:Al$_2$O$_3$ (Ruby) may also be pumped by green lasers. Direct pumping of Cr:LiSAF has been successfully demonstrated but the efficiencies are limited by considerations similar to those for alexandrite as well as by the fact that the optimal diode wavelengths from the viewpoint of absorption are not readily available. Unfortunately Cr:LiSAF does not absorb well in the green. However, there are absorption peaks near the 650-670 nm spectral range corresponding to the frequency doubled wavelengths of the 1.3 μm transition in Nd-doped materials such as YAG, YLF, YALO and YVO$_4$. Such lasers are now commercially available with power outputs well in excess of 5 W. The efficiency of such lasers is not as high as the one based on fundamental radiation, but nonetheless can exceed 20%, leading to wall plug efficiencies for a CW laser-pumped Cr:LiSAF that is on the order 5-10%—well in excess of the efficiency achievable with flashlamp pumping.

Another class of lasers that can be pumped by the frequency converted radiation of diode pumped green lasers are solid state dyes. These media, while highly versatile as tunable materials, suffer from short upper state lifetimes and longevity issues that have so far limited their utility in high power applications. Direct diode pumping in particular, presents major challenges due to the short lifetimes. On the other hand, use of high power pulsed green lasers to pump these materials resulted in very high slope efficiencies but placed serious operational constraints on the laser material due to degradation issues. Using the small near diffraction limited spots available from green diode pumped lasers can be used to advantage, for example, by allowing periodic translation of the dye gain material to continually expose fresh spots to the pump beam, thereby substantially extending the useable lifetime of the gain material.

These and other alternative configurations that may be adapted for pumping by the frequency converted radiation of diode pumped Nd-doped gain materials all fall within the scope of the present invention. While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention of the entire laser source. Expected variations or differences in the results are contemplated in accordance with the objects and practices of the present invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tunable laser system pumped by a high brightness source, comprising:
   an Alexandrite tunable laser gain medium disposed in a resonator defined by an input mirror and an output mirror; and, wherein pump light from a green laser high brightness source, having a wavelength in a range of 520 to 570 nm, is directed through the input mirror and focused onto the Alexandrite tunable laser gain medium and wherein a pump spot size formed on the Alexandrite tunable laser gain medium is selected to produce a pump intensity such that an Alexandrite laser operation threshold is exceeded, resulting in tunable, stable laser output from the Alexandrite laser.

2. The system of claim 1 wherein the green laser high brightness source is a diode pumped laser.

3. The system of claim 1 wherein the green laser high brightness source is a green laser operating near 532 nm.

4. The system of claim 1 wherein the green laser high brightness source is a CW green laser operating near 532 nm.

5. The system of claim 1 wherein the green laser high brightness source is a pulsed green laser operating near 532 nm.

6. The laser system of claim 1 wherein the optical-to-optical efficiency is greater than about 10%.

7. The laser system of claim 1 wherein the tunable laser output is obtained with a wall plug efficiency greater than about 2%.

8. The laser system of claim 1 wherein the high brightness pump laser has a beam quality of $M^2$ less than about 6.

9. The laser system of claim 1 further including frequency conversion elements inside the resonator.

10. The laser system of claim 1 further including tuning elements inside the resonator.

11. The laser system of claim 1, wherein the tunable laser medium is a composite comprising a doped and an undoped material.

12. The laser system of claim 1 wherein the high brightness pump laser is pulsed.

13. The laser system of claim 1 wherein pump radiation is directed through an undoped portion of the tunable laser medium.

14. The laser system of claim 1 wherein the tunable power output exceeds 0.1 W.

15. The laser system of claim 1 wherein the output beam has a beam quality with $M^2$ less than about 10.

16. The laser system of claim 1 wherein the gain medium is alexandrite heated to above room temperature.

* * * * *